Aug. 2, 1966 R. P. CASE ETAL 3,264,615

MEMORY PROTECTION SYSTEM

Filed Dec. 11, 1962 6 Sheets-Sheet 1

INVENTORS
RICHARD P. CASE
HENRY G. JONES
RONALD M. SMITH
JOHN A. de VEER

BY [signature]
ATTORNEY

Aug. 2, 1966 R. P. CASE ETAL 3,264,615

MEMORY PROTECTION SYSTEM

Filed Dec. 11, 1962 6 Sheets-Sheet 5

United States Patent Office 3,264,615

Patented August 2, 1966

3,264,615

MEMORY PROTECTION SYSTEM

Richard P. Case, La Grange, Henry G. Jones and Ronald M. Smith, Poughkeepsie, and John A. de Veer, Millbrook, N.Y., assignors to International Business Machines Corporation, New York, N.Y., a corporation of New York Filed Dec. 11, 1962, Ser. No. 243,883
10 Claims. (Cl. 340—172.5)

The present invention relates generally to electronic data handling apparatus, and more particularly to an improved system for monitoring an addressable memory in an electronic data handling system to protect addressable locations therein from improper use.

As is well-known, present day electronic data handling systems utilize storage devices, usually referred to as "memories" for holding items of information employed in or manipulated by the apparatus. A memory comprises a plurality of addressable locations each adapted to store an item of information, generally called a "word," in the form of a plurality of binary bits. Each word storage location has an address which defines its position in the memory, and access to that location for the purpose of storing a word therein or reading out a word previously stored is gained by specifying the proper address along with a command or instruction specifying the operation to be performed at the specified address.

Although the specific form of the addresses and the manner of storing and retrieving words in a memory varies in accordance with the particular type of memory used, all systems employ an ordered arrangement of address numbers to identify the individual addressable location. A plurality of binary bits are employed to represent each address number, the number of bits (address length) being determined by the number of addressable locations involved. Although various binary codes are sometimes used, the addresses are commonly in the form of binary numbers; thus an address length of 12 binary bits is capable of specifying 4,096 separate addressable locations, an address length of 15 bits can specify 32,768 locations, etc. Each of the locations has associated therewith a different address made up of a unique combination of the total number of address bits.

Modern data processing systems employing intricate and complex manipulations of data and instruction words stored in memory which frequently involve modification of addresses by indexing and indirect addressing, and complicated transfers of words from location to location within the memory. In such systems there exists the possibility of accidental destruction of data or instruction words through program errors, operator's errors or various machine errors. To insure the protection of certain words, for example, supervisory program instructions which may be stored in the memory, it is desirable to establish certain areas of memory or groups of locations which have a "protected" status, and to provide means for determining and signalling unauthorized accesses to these protected addressable locations. Moreover, it is desirable to provide protection means capable of protecting groups of addressable locations which may vary in size and position within the memory. It is also desirable to provide protection means which are subject to program control so that the size and positions of protected groups of addresses may be altered during operation of a program and so that access to normally protected addresses may be obtained when necessary.

Memory protection means for data processing systems are known in the art. The prior art protection systems usually employ register means in which addresses identifying upper and lower bounding limits of a protected area of memory are stored. Addresses applied to the memory for gaining access thereto are compared with both the upper and lower bounding addresses to determine whether access is sought in the protected area. If comparison shows that the address sought to be accessed is lower than the upper bounding address and higher than the lower bounding address, violation of the protected area is signalled. Variations of the size and position of the protected area are altered under program control by changing the contents of the upper and lower bounding address registers.

Protection systems of this type have the advantage that any number of addressable locations, from a single one to the entire group in the memory, may be incorporated in the protected group. They have disadvantages, however, in that several decisions (higher than—equal to—lower than) must be made concerning each address sought to be accessed and the two bounding addresses. In addition, means for registering two full addresses must be provided in the system.

It is the primary object of the present invention to provide an improved memory protection system which is simpler and more economical than prior art systems.

More specifically, it is the object of this invention to provide a system for protecting groups of locations in an addressable memory, which groups are variable in size and position, without the necessity of maintaining two complete memory addresses for comparison with an address sought to be accessed.

It is a further object of this invention to provide a system for protecting groups of locations in an addressable memory, which groups are variable in size and position, that requires only a single comparison decision of the information defining the protected area with an address sought to be accessed.

It is also an object of this invention to provide a system for protecting groups of locations in an addressable memory wherein the position of the protected area is controlled by means for specifying less than one complete address.

Another object of the invention is to provide a system for protecting groups of locations in an addressable memory wherein the size of the protected area is controlled by means for specifying a number of bits to be compared.

Still another object of the invention is to provide a system for protecting a plurality of groups of locations which are non-contiguous in position within the memory.

A further object of the invention is to provide a memory protection system of the type described which is fully subject to program control.

A still further object of the invention is to provide a protection system that is largely "free running," that is, wherein determination of whether an address sought to be accessed is within a protected area is accomplished without the need for a complex control system.

These objects are achieved by the provision in a data processing system having an addressable memory, of register means for holding an address field which consists of a plurality of address bits that are common to a group of addresses, and comparing means for comparing this field with addresses sought to be accessed to determine whether the addresses sought to be accessed contain the pattern specified by the field. Control means are provided for signalling a violation of a protected area in response to a predetermined result of the comparison. Means are provided for causing either an "equal," or an "unequal" comparison result to signal a violation. Thus, the address field may specify either the protected area or an unprotected area separating non-contiguous protected areas.

Variation in size of the protected area or areas of memory is accomplished by the provision of masking means for varying the number of address bits in the field which must be compared. A count register holding a value identifying the number of bits to be compared controls the masking means.

The field register, count register and the means for determining which comparison result will signal violation of a protected area are all subject to program control so that their contents and status may be altered at will. Once these registers have been properly loaded and conditioned, the comparison of each address applied to the memory is accomplished automatically without the need for complicated timing or gating control pulses. It is only necessary to provide a simple sample pulse to the protection circuit during each memory access cycle to determine whether the address sought to be accessed lies within a protected area, and whether access to that address is authorized.

The foregoing and other objects, features and advantages of the invention will be apparent from the following more particular description of the preferred embodiments of the invention, as illustrated in the accompanying drawings.

In the drawings:

FIG. 1*a* is a block diagram of a data processing system embodying the present invention;

FIG. 1*b* is a diagrammatic illustration of a typical instruction word format for the system of FIG. 1*a*;

FIG. 1*c* is a diagrammatic illustration of a typical data word for the system of FIG. 1*a*;

FIG. 1*d* illustrates the format of an instruction which may be used to load and enable the protection circuits provided in accordance with this invention;

FIG. 1*e* illustrates an instruction which may be used to disable the protection circuits;

FIG. 2 is a chart illustrating how the size and location of protected groups of addresses is controlled in accordance with this invention;

FIG. 3*a* is a diagrammatic illustration of a memory illustrating the ordered arrangement of addresses;

FIGS. 3*b* through 3*h* illustrate how the addresses specified by a group of field bits may be varied under control of a count value;

FIGS. 4*a*, 4*b* and 4*c*, taken together, form a schematic diagram of the protection circuits provided in accordance with this invention; and FIG. 4*d* shows how FIGS. 4*a*, 4*b* and 4*c* may be placed to form a composite circuit diagram.

GENERAL DESCRIPTION

(a) *The data processing system*

The present invention is concerned with the protection of groups of addressable locations in a memory associated with an electronic data processing machine. In the following description of the invention only the circuitry directly involved in carrying out the invention will be disclosed in detail. A general description of an exemplary data processing system is given to illustrate the association of the memory protection circuitry with other parts of the system. Since data processing systems of the type here involved are known in the art, no detailed explanation will be given herein. Complete explanations of systems of the type shown generally in FIG. 1 are given in the following United States patents, which are incorporated herein by this reference:

U.S. 2,974,866 to J.A. Haddad, et al., for "Electronic Data Processing Machine" issued March 14, 1961; U.S. 2,950,465 to P. E. Fox et al., for "Electronic Data Processing Machine" issued August 23, 1960; U.S. 3,036,773 to J. L. Brown, for "Indirect Addressing In An Electronic Data Processing Machine" issued May 29, 1962; U.S. 3,048,332 to F. P. Brooks, Jr. et al., for "Program Interrupt" issued August 7, 1962.

The data processing system shown in FIG. 1*a* comprises a Memory 50 that comprises a plurality of addressable locations each capable of storing a word including, in the illustrative embodiment, 36 binary bits. For the purpose of this description, it will be assumed that the Memory 50 comprises 32,768 separate addressable locations. It further includes Memory Addressing Circuits 51 which are responsive to application of binary addresses to select addressable locations within the Memory 50 for access. To address 32,768 separate locations, 15 binary bits are required. Accordingly, the Memory Addressing Circuits 51 will decode different combinations of 15 bits to provide access to the addressable locations. Each location has an address which is a number from 0 to 32,767, and each 15 bit binary address represents one of those numbers.

Memory 50 also includes Memory Control Circuits 52 which respond to commands supplied by the system to control the memory to STORE information at an address accessed by Memory Addressing Circuits 51, or to READ information from said address.

Memory Data Circuits 53 associated with the Memory 50 receive data from the system and supply it to the Memory 50 during STORE operations, and receive data from the Memory 50 and supply it to the system during READ operations.

The precise structure of the Memory 50 and its associated circuitry 51, 52 and 53 is not necessary to an understanding of this invention. U.S. Patent 2,950,465 discloses an electrostatic memory system which operates in the manner just described and which may be employed. U.S. Patent 3,036,773 discloses a magnetic core memory which also operates in the manner described, and which may be employed.

In the data processing systems disclosed in the patents referred to above, the Memory 50 stores both instruction words and data words. The instruction words, considered in one or more sequences, constitute one or more programs for processing data. The data words are operands which are processed by the programs of instruction words. Referring to FIG. 1*b*, an illustrative instruction word format may include 12 binary bits for specifying an operation to be performed, and 15 bits specifying the address of a data word or operand to be operated upon. The operation specifying (operation code) bits may occupy the sign bit position and bit positions 1-11 in the instruction word. Certain additional bit positions may be reserved for "Flag or Tag" indicia specifying whether or not the instruction involves indirect addressing and specifying indexing functions. These indirect addressing and indexing functions are explained in detail in U.S. 3,036,773. FIG. 1*c* illustrates a typical data word, wherein all 36 bits are employed to represent an operand.

Instruction words stored in Memory 50 are read out in succession in accordance with successive addresses supplied to the Memory 50 from an Instruction Counter 54. The Instruction Counter is capable of specifying instruction addresses in sequence in accordance with a program. Cable 55 transmits instruction addresses from Instruction Counter 54 to Memory Addressing Circuits 51. The instruction words from the addresses specified by the Instruction Counter are transferred via cable 56 to a Memory Register 57 capable of holding one complete 36 bit word. The Memory Register passes the operation code bits and the address bits of the instruction via cable 58 to an Instruction Register 59 which comprises an Operation Code section and an Address section. The operation code bits are transferred to an Operation Decoder 60 where they are interpreted and decoded into a plurality of command pulses used to execute the instruction. The address part of the instruction is transmitted via cable 61 to the Memory Addressing Circuits 51 of Memory 50 to provide access to the particular addressable location in Memory 50 that is involved in carrying out the instruction.

To facilitate an understanding of the flow of information, each block representing a register in FIG. 1*a*, is provided with characters along one edge to indicate the bit positions of an instruction or data word handled by that register. Accordingly, Memory Register 57 has the characters S and 35 at the lower edge to indicate that a full 36 bit word is handled. Instruction Register 59 has S, 11, 21 and 35 along its lower edge to indicate that the Operation Code section handles bits S through 11 while the Address section handles bits 21 through 35.

The data processing system includes a plurality of Arithmetic and Logic Circuits, generally indicated at 62, which are employed in processing data in accordance with the program of instructions. Since these circuits need not participate in carrying out the present invention, they will not be further described. The patents referred to above disclose the nature and operation of these circuits and their cooperation with the other elements of FIG. 1*a*.

As mentioned earlier, operations of the system shown in FIG. 1*a* are controlled by commands developed by the instructions called out from Memory 50 by the Instruction Counter 54. These operations are enabled and controlled by timing and control circuits diagrammatically shown at 63, 64 and 65. A clock 63 is provided which generates a plurality (for example, twelve) of spaced pulses which define an operating cycle for the system. Two basic types of cycles are necessary; instruction cycles which are conventionally termed I-cycles, and execution cycles which are termed E–cycles. During an I–cycle, an instruction is withdrawn from Memory 50 and interpreted. E–cycles are used to execute the instruction. Each I–cycle is normally followed by one or more E–cycles. Some instructions may be executed in one E–cycle and others may require several Commands developed by an instruction determine the number of E–cycles requirde. A Cycle Timer 64 responds to the clock pulses from clock 63 and certain commands from Operation Decoder to provide I–cycles and E–cycles each including the plurality (for example, twelve) of clock times. These cycle times are supplied to Gate Control Circuits 65 along with commands from the Operation Decoder 60. The Gate Control Circuits provide the many gating pulses that are employed to carry out the instructions. The referenced patents disclose in detail how this may be accomplished. Words removed from Memory 50 are interpreted as instructions or data in accordance with the kind of cycle (I or E) existing when they are removed.

In FIG. 1*a* there also are shown Program Interrupt Circuits 66. These circuits are provided for interrupting the normal sequence of operation of the system in response to indication of certain conditions, for example, errors. The Program Interrupt Circuits are provided with inputs from various parts of the system which are monitored. These inputs indicate to the Program Interrupt Circuit 66 when certain conditions are present that require the machine to deviate from its normal program. In response to the indications, which are assigned priority values, the Program Interrupt Circuits break into the program sequence and cause one or more special operations to be performed. Different interrupt conditions require different special operations, so provision is made for each indication to specify a location in the Memory 50 wherein will be found a special instruction which is used to initiate an interrupt program. Different instructions are called for as a result of different conditions occurring in the machine. These instructions permit interrupt conditions in the machine to initiate, upon completion of the instruction during which the condition occurred, a new program of instructions starting at the location indicated by the Program Interrupt Circuits. This is accomplished by storing the state of the Instruction Counter 54 in the Memory 50 to remember where the current program was interrupted and then executing a different interrupt program of instructions by placing a new address into the Instruction Counter 54. When the interrupt program is completed, the Instruction Counter 54 is restored to its previous condition causing the interrupted program to continue from the point at which the interruption occurred. U.S. Patent 3,048,332, referred to above, describes in detail how the Program Interrupt Circuits 66 may operate. It is not believed necessary to describe them in detail herein. In FIG. 1*a* only the cable 67 which permits addressing of the Memory from the Program Interrupt Circuits is shown. An address transferred to Memory 50 over this cable initiates the interrupt program. For the sake of simplicity, the other control circuits of the unit 66 have been omitted.

(b) *The memory protection circuits*

The memory protection circuits provided in accordance with this invention are illustrated in block form in FIG. 1*a*.

As explained earlier, the present invention provides memory protection by comparing addresses sent to the Memory 50 with a configuration of address bits which is common to a plurality of addresses. A predetermined result of this comparison signals an attempted access to a protected area. Accordingly, there is provided in the data processing system a Field Register 68 capable of storing a plurality of address bits. The Field Register 68 is adapted to store seven binary bits which correspond to the seven high order bits of a memory address. It will be recalled that a complete memory address in the illustrative embodiment consists of 15 bits occupying positions 21–35 of the instruction word. The seven positions of Field Register 68, then, represent bit positions 21–27. These seven bits are sufficient to specify a block of 256 addresses; that is to say, any particular configuration of bits in these seven positions will be common to 256 different addresses.

To determine whether an address sought to be accessed is within the block specified by the Field Register 68, each address sent to the Memory 50 is compared with the Field Register contents. As shown at 69 in FIG. 1*a*, Comparison Circuits are provided for this purpose. The Comparison Circuits 69 receive inputs from the Field Register 68 and from the address portion of the Instruction Register 59. The cable 70 extending from the Instruction Register 59 applies signals, representative of bits 21–27 (the seven high order bits) of each address which is supplied thereto, to the Comparison Circuits. Cable 71 supplies signals representative of the address field bits 21–27 from Field Register 68. The Comparison Circuits compare the corresponding bits from the two registers and provide a signal indicating whether or not any of the bits differ in value. This signal is supplied via line 72 to Protect Control Circuits 73 where it is mixed with outputs of a Status Register 74, and a Mode Trigger 75. The Status Register 74 indicates whether an equal comparison represents a violation of a protected area, or whether an unequal comparison represents a violation. By controlling the state of the Status Register 74, either the block of addresses represented by the Field Register, or all addresses outside of the specified block, may be protected. The Mode Trigger 75 indicates whether the protection circuits are effective or not. By controlling the state of Trigger 75, the entire protection system may be enabled or disabled at will.

An important purpose of memory protection systems is to prevent accidental destruction of information by unauthorized accesses. Accesses to memory for the purpose of reading information stored therein are not destructive, so such accesses may be permitted even though unauthorized. Accesses for the purpose of storing new information are destructive, however, since the storage of new information involves erasure of information previously stored. Accordingly the Protection Control Circuits 73 are provided with an input line 76 from the Operation Decoder 60 which indicates, for each memory access, whether or not a STORE operation is to be performed at the address specified by the instruction involved. If a STORE operation is involved in an unauthorized access, the Protection Control Circuits 73 apply signals via lines 77 and 78 to the Memory Control Circuits 52 to change the STORE operation to a READ operation, so that the information at the accessed address is not destroyed. The Protection Control Circuits also signal the unauthorized access to the system so that corrective action may be taken. A signal from the circuits 73, indicating an unauthorized intrusion into a protected area of Memory 50, may be employed in any of several ways depending upon the data processing circuit involved. In the simplest case, such a signal may be used merely to light a control panel lamp to alert an operation to the intrusion. Alternatively, it may be used to halt all operations in the system to permit some corrective action to be taken. In the system of FIG. 1*a*, the signal is sent via violation indicator line 79 to the Program Interrupt Circuits 66, so that the program including the unauthorized access to Memory 50 may be interrupted and analyzed by a diagnostic routine. U.S. 3,048,332 illustrates how interrupting may be carried out in response to an indicator signal.

An important feature of this invention is the capability of varying the size and location of the protected area of storage, and the ability to include non-contiguous addresses in the protected block. As has already been explained, the protection circuits include a Status Register 74, the state of which determines whether equality or inequality of the comparison between the Field Register contents and the corresponding bits of an address constitute an intrusion into the protected area. It will be seen that the use of this status information provides substantial flexibility in that it determines whether the block of addresses specified by the Field Register defines the protected area or an unprotected area bounded on both sides by protected addresses. This arrangement thus permits the protection circuitry to specify protected areas which are non-contiguous.

Additional flexibility is achieved by employing means for varying the number of effective address field bits which are compared. As shown in FIG. 1*a*, a Count Register 80 is provided for this purpose. The Count Register 80 stores a value from zero to seven which determines how many bits of the Field Register 68 are to be compared with an address sent to Memory 50. As will be explained later in detail, the value stored in the Count Register 80 enables comparison of a number of address field bits equal to the value stored, starting with the highest order bit (21). Bits which are not enabled are assumed to be equal. The size of the protected area may thus be varied without altering the contents of the Field Register 68 by changing the contents of the Count Register. FIG. 2 of the drawings illustrates this feature of the invention. The vertical columns of the chart represent the several bits 21–35 of an address. These bits represent, from left to right, successive orders of a binary word in order of decreasing significance. Thus bit 21 represents $2^{14}$, bit 22 represents $2^{13}$ . . . and bit 35 represents $2^0$. The horizontal rows of the chart represent the comparison conditions for the various values stored in the Count Register. The shaded portion of each row indicates that no comparison is made of the bits within the shaded areas. The unshaded areas represent bit positions which are enabled for comparison. At the right of each row a figure appears which indicates the total number of addresses which are protected under the conditions represented. It will be observed that while only eight different values may be stored in the Count Register, sixteen different protection conditions are possible, eight conditions for each of the "equal" or "unequal" status values in the Status Register 74.

The chart of FIG. 2 shows that if the Count Register 80 contains the value "0," no bits of the address field are compared and any address is assumed to be within the block specified by the Field Register. If the Status Register is set to indicate that an "equal" comparison constitutes an intrusion into the protected area, then the entire Memory 50, that is, all 32,767 locations, is protected. If the Status Register 74 indicates that an "unequal" comparison constitutes a violation, then no locations are protected.

If the Count Register 80 contains a "1" (first and tenth rows of the chart of FIG. 2) then only the high order bit of the Field Register is enabled for comparison, and all others are assumed equal. The high order bit of an address determines whether that address is in the upper or lower half of the memory (a binary 0 in this position specifies address 16,383 and under, while a binary 1 specifies addresses 16,384 to 32,767). Accordingly, half of Memory 50 is protected in this situation. The value stored in the Status Register 74 determines which half.

Examination of FIG. 2 shows that for each successive count value in Count Register 80, the number of protected locations is halved if the Status Register is set to indicate an "equal" comparison as an intrusion. If the Status Register is set to indicate an "unequal" comparison as an intrusion, the successive values in the Count Register increase the number of protected locations, correspondingly.

A more complete understanding of the variable size and location feature of this invention may be obtained through examination of FIGS. 3*a* through 3*h*. FIG. 3*a* is a diagrammatic illustration of a memory such as the Memory 50, illustrating the manner in which addresses may be assigned. The addressable locations, one of which is shown extended from the block at 50*a*, are functionally arranged in rows and columns, there being for a 32,768 word memory, 256 columns and 128 rows. The locations are assigned addresses in sequence from 0 to 32,768 starting at the upper left corner of the array and progressing across each row from left to right in sequence. With the arrangement shown, a 15 bit binary address is required to address each location. The 8 low order bits define the column in which the location resides, while the 7 high order bits define the row. Consider, for example, address 23,850. Represented in the binary notation this is 101110100101010.

The seven high order bits indicate that the location is in the 93rd row (1011101=93) and the eight low order bits indicate that the location is in the 42nd column (00101010=42)

of the array.

Since the field Register 68 is arranged to store seven high order address bits, the address field specified therein includes at least one full row of addressable locations in the Memory 50. By disabling or masking out some of the bits, the field may be enlarged. FIGS. 3*b*–3*h* illustrate this enlargement. In FIGS. 3*b*–3*h* it is assumed that the Field Register is loaded with the binary bits 1011101. FIG. 3*b* shows that when only the highest order bit is enabled for comparison, sixty-four rows of locations are specified. The lowest and highest addresses in the group are shown in the drawing. FIGS. 3*c*–3*h* illustrate the size of the specified area and the lowest and highest addresses therein for Count Register values 2, 3, 4, 5, 6 and 7, respectively.

(c) *Instructions for enabling and disabling the protection circuits*

FIGS. 1*d* and 1*e* illustrate exemplary instructions for establishing and releasing the protect mode of operation. FIG. 1*d* illustrates a typical SET PROTECT MODE instruction. As shown, the left-hand twelve bits of the instruction contain the operation code bits which, when decoded by Operation Decoder 60, provide the commands for clearing and setting the registers 68, 74 and 80 and the Mode Trigger 75. Positions 21–27 of the instruction contain the address field to be inserted in Field Register 68. Position 32 contains the status bit to be inserted in Status Register 74 and positions 33–35 contain the binary coded count value to be stored in Count Register 80. Since all the information necessary to execute the SET PROTECT MODE instruction can be contained within the instruction word, this instruction does not require a memory reference and can be completed in one I-cycle. After the instruction has been transferred to Instruction Register 59 and before the Memory Register 57 is cleared, the field status and count information are loaded from the Memory Register to their proper places in registers 68, 74 and 80, and the program can move directly to the next instruction.

Alternatively, the SET PROTECT MODE instruction may contain an address in positions 21–35 at which the field, status and count information is stored and the loading operation may be accomplished by decoding the instruction during an I-cycle and then reading the field, status and count values from Memory 50 and loading it in the proper registers during a following E-cycle. The register loading instructions described in the Brooks patent are executed in this manner. Reference is made to that patent for a detailed description of loading operations.

The function of a RELEASE PROTECT MODE instruction is merely to reset Mode Trigger 75 to disable the protection system. Accordingly, as shown in FIG. 1*e*, this instruction requires nothing more than an operation code.

DETAILED DESCRIPTION OF PROTECTION CIRCUITS

Figure 4A:
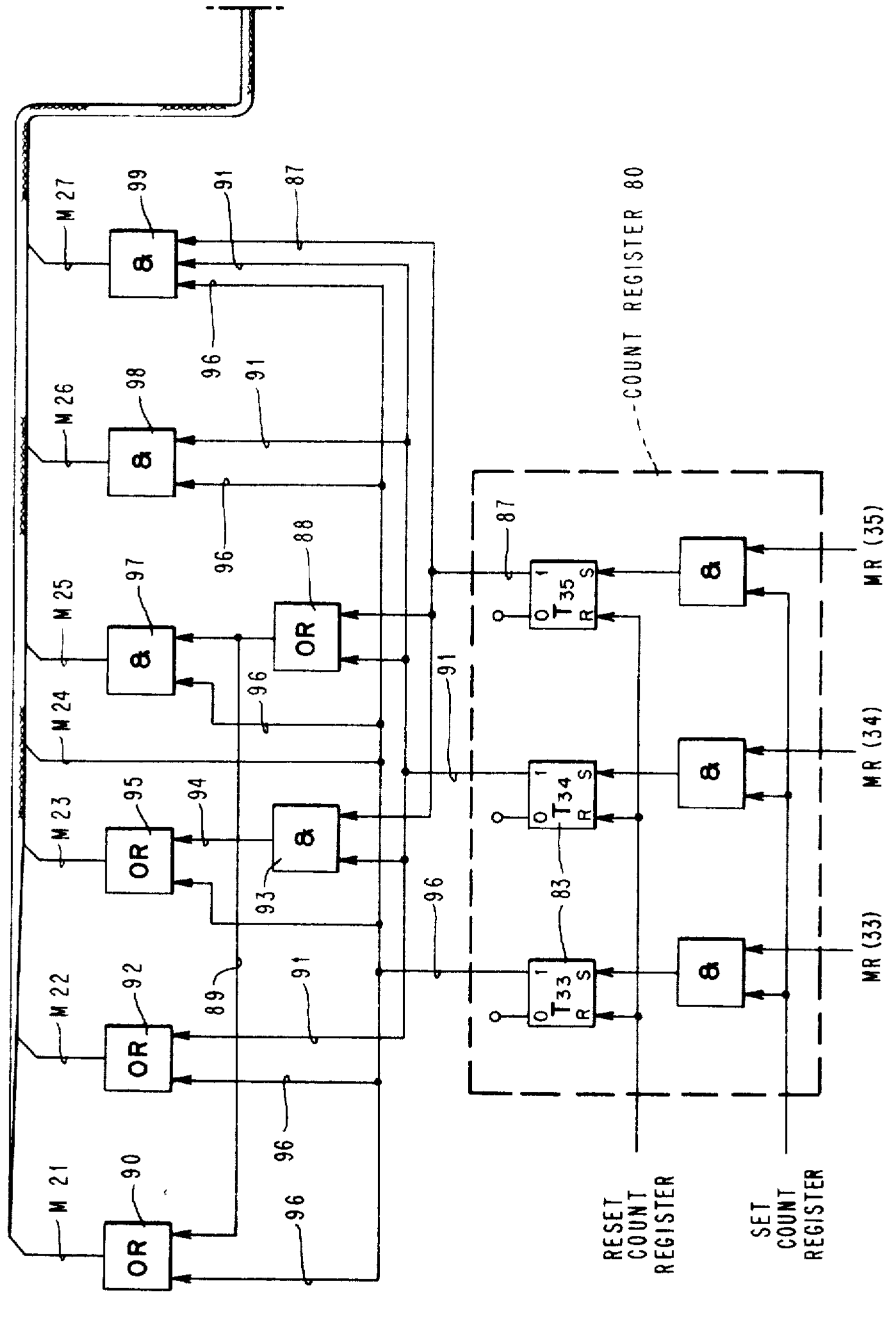
Figure 4B:
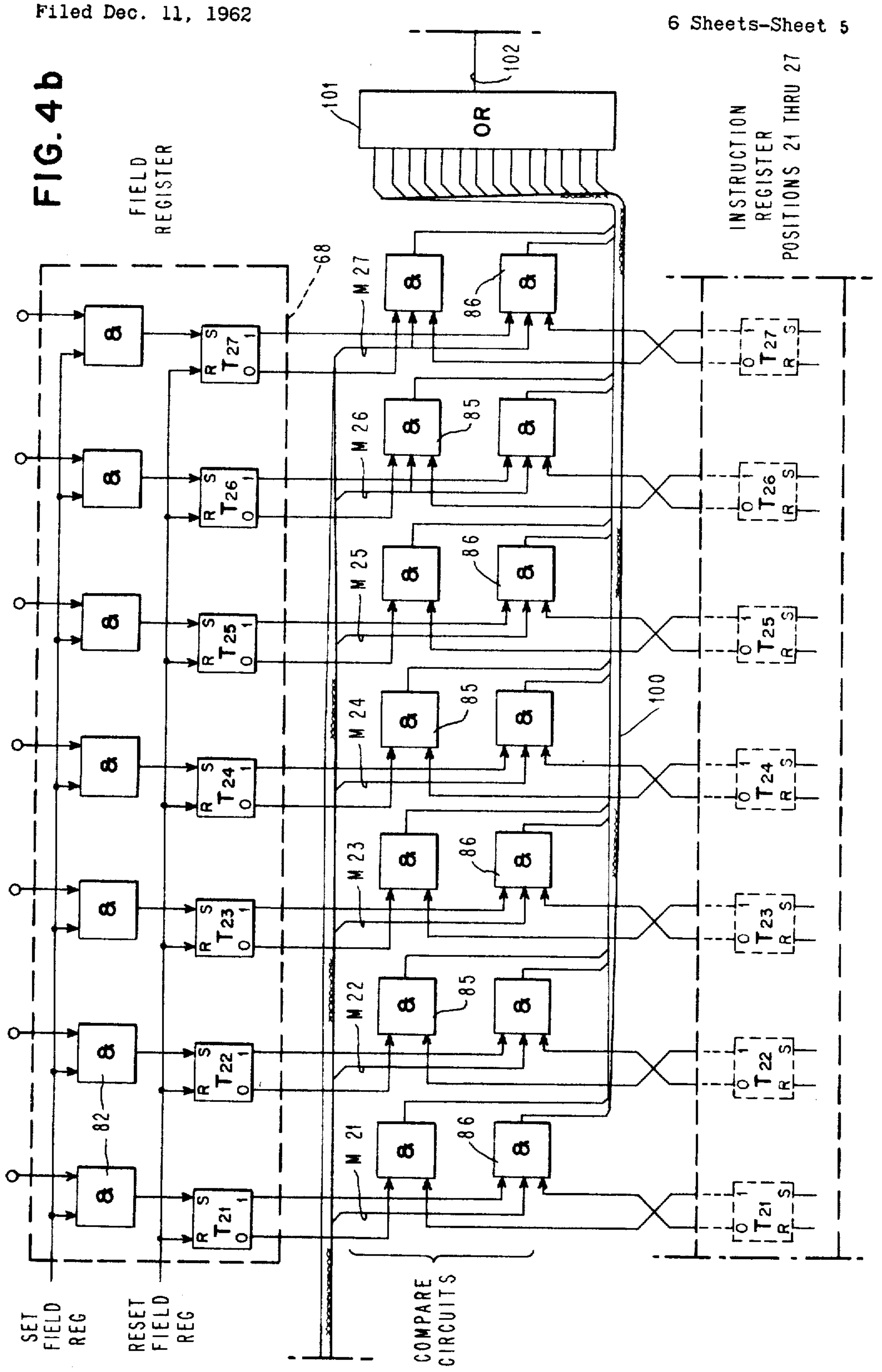
Figures 4C, 4D:
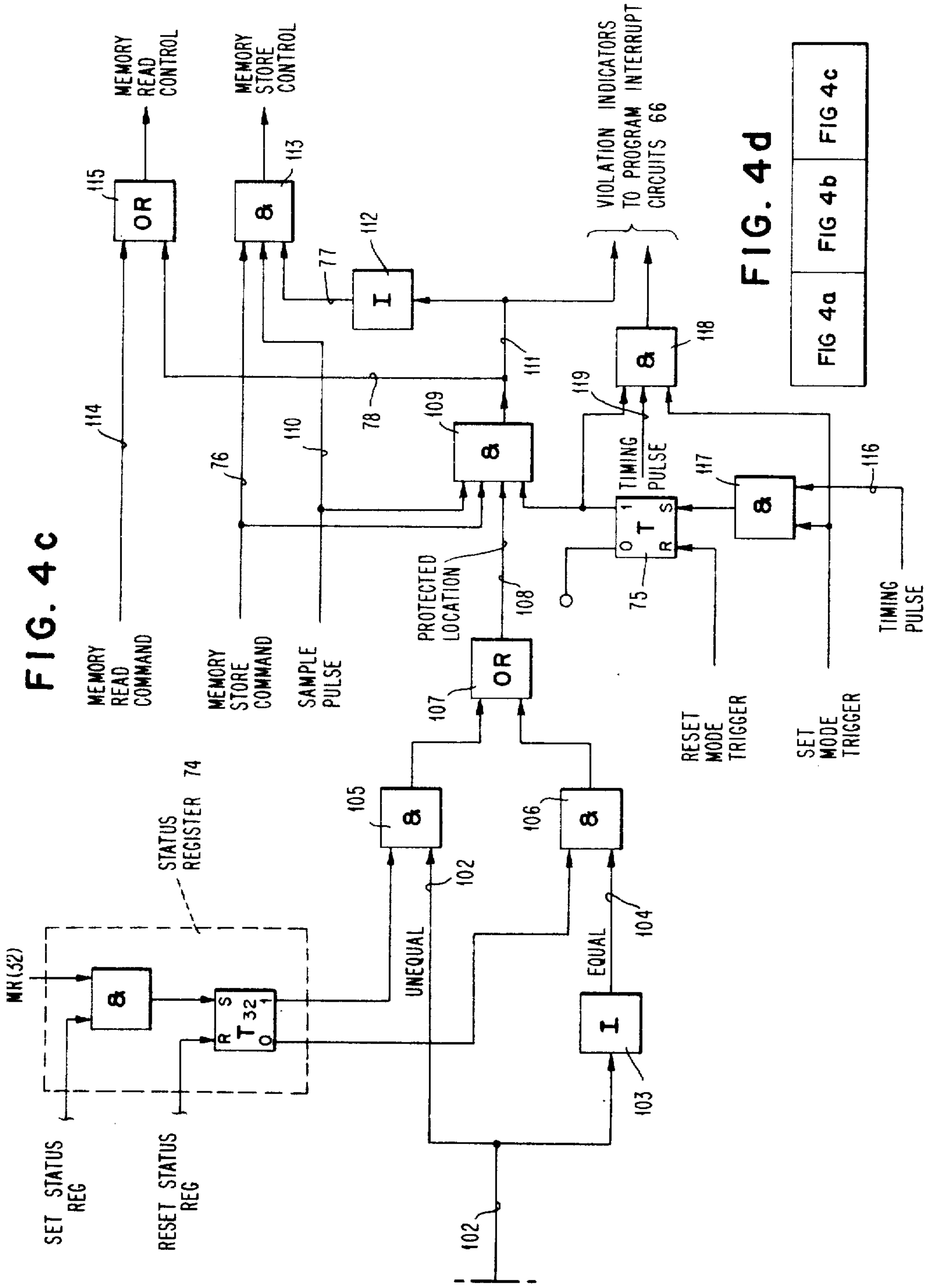

FIGS. 4*a*, 4*b* and 4*c*, taken together as shown in FIG. 4*d*, form a schematic circuit diagram of a protection system embodying the present invention. Referring to FIG. 4*b*, the Field Register 68 is shown as comprising seven bistable set-reset triggers 81, which may be of conventioned design. The triggers 81 are shown in FIG. 4*b* as blocks bearing the letter T. Each block also bears a number from 21 to 27 which indicates the address field bit position it represents. Each trigger 81 has two separate input terminals labeled R and S, respectively, and two output terminals labeled 1 and 0. A positive input signal at terminal R resets the trigger 81 and a positive input signal to terminal S sets it. When in the reset state the trigger produces a positive output signal at terminal 0; when in the set state it produces a positive signal at output terminal 1.

The Field Register 68 is loaded from the Memory Register 57. A plurality of lines, identified in FIG. 4*b* as MR(21) . . . MR(27) are provided from bit positions 21 to 27, inclusive, of Memory Register 57 to the Field Register 68. Each line MR(21) . . . MR(27) receives a positive signal if the corresponding bit position of the Memory Register 57 (not shown in detail) is set to represent a binary 1. If the bit position of Memory Register 57 is set to zero, no signal is supplied. The lines MR(21) . . . MR(27) are gated to the S input terminals of the several bit positions of Field Register 68 through AND gates 82. These AND gates are primed by a SET FIELD REG. line controlled by Gate Control Circuits 65. A RESET FIELD REG. line, also controlled by the Gate Control Circuits 65, supplies the R input terminals of the Field Register triggers. When an address field is to be inserted in Field Register 68 an appropriate instruction is given which causes the RESET FIELD REG. line to be activated to clear the register and then gates in the desired address field bits from Memory Register 57. These address field bits will have been previously withdrawn from Memory 50 by the same instruction. No detailed description of the loading operation is believed necessary. U.S. 3,048,332 gives several detailed examples of register loading instructions.

The loading instruction also loads a count value in the Count Register 80, and a status value in Status Register 74 at the time the Field Register 68 is loaded. FIG. 4*b* shows that the Count Register 80 comprises three triggers 83 which store values from 0 to 7 in binary code. The trigger in bit position 33 stores the $2^2$ order, while those in bit positions 34 and 35 store the $2^1$ and $2^0$ orders, respectively. These triggers are loaded from positions 33–35 of Memory Register as indicated by input lines MR(33) . . . MR(35). During the loading operation, the triggers 83 are cleared by RESET COUNT REG. line and then the information supplied via MR(33) . . . MR(35) is gated in through gates 84, controlled by SET COUNT REG. line from the Gate Control Circuits 65.

The Status Register receives its status value from position 32 of the Memory Register 57. It is loaded in precisely the same manner as the other registers just mentioned.

Figure 1A:
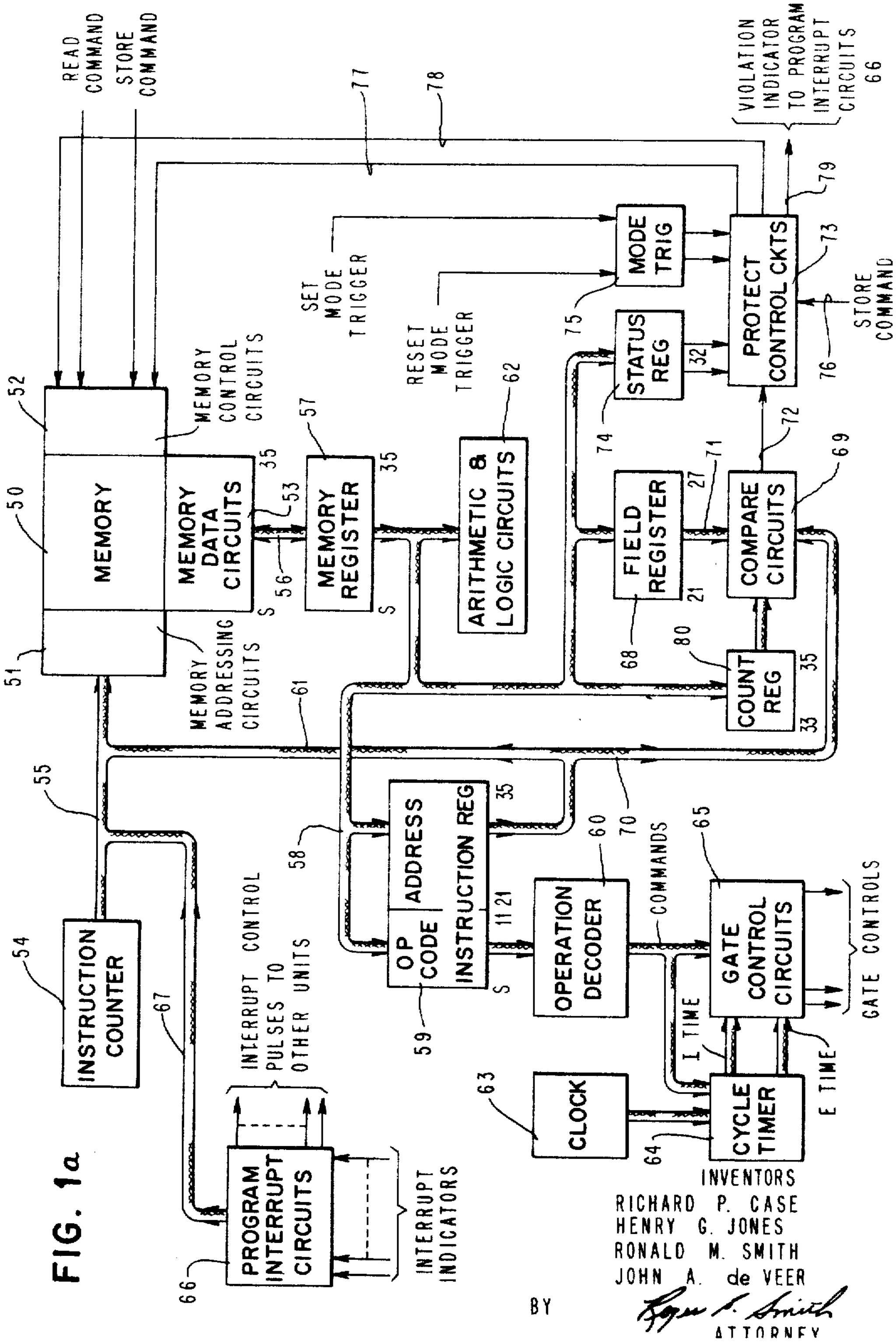
Figure 2:
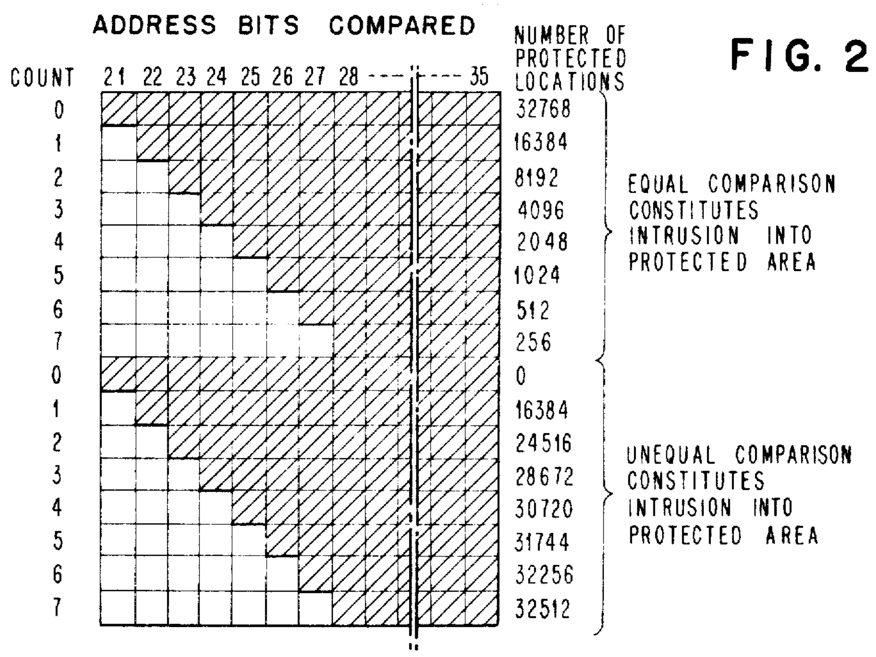
Figure 1B:
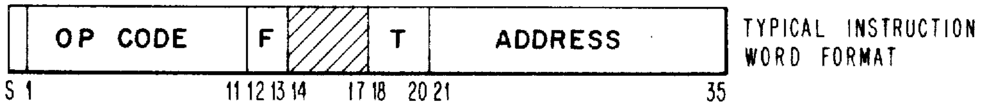
Figure 1C:
Figure 1D:
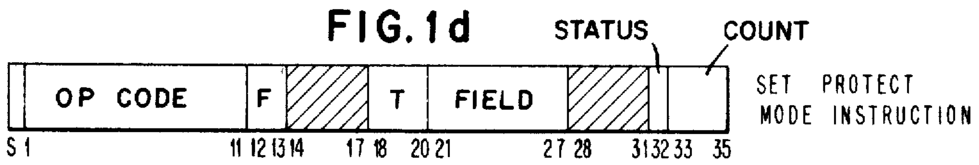
Figure 1E:
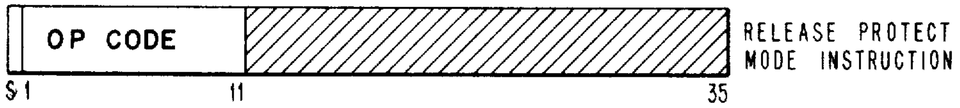
Figure 3A:
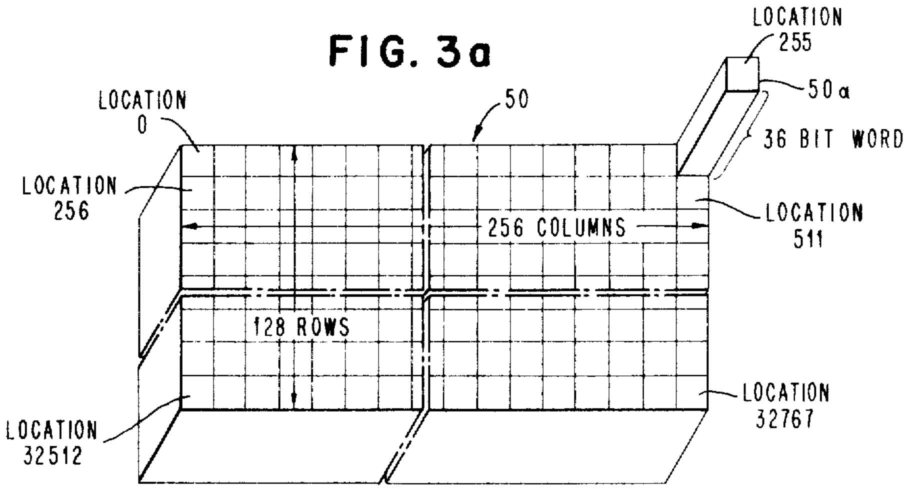
Figure 3B:
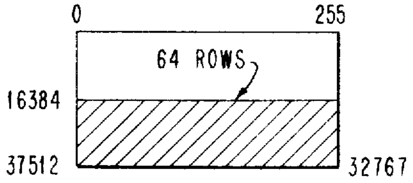
Figure 3F:
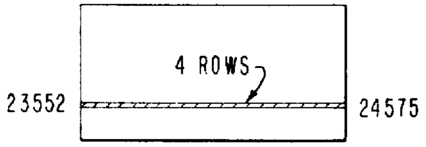
Figure 3C:
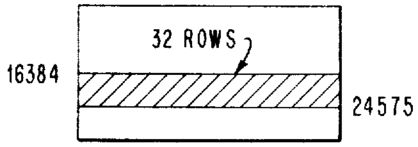
Figure 3G:
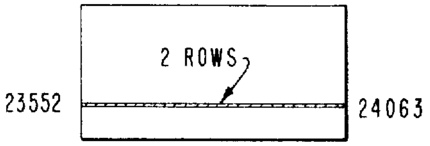
Figure 3D:
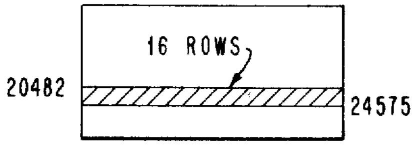
Figure 3H:
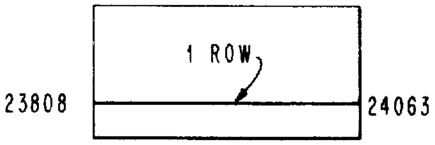
Figure 3C:
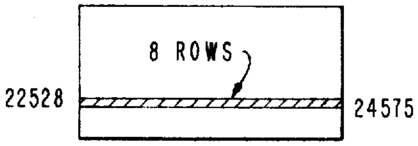

An instruction which loads the Field Register, Count Register and Status Register will also set the Mode Register 75 to enable the protect mode of operation. The operation code portion of the instruction, decoded and mixed with the cycle timing pulses, will cause Gate Control Circuits 65 to activate the SET MODE TRIGGER line shown in FIG. 2*c*, which will set Mode Trigger 75. The Mode Trigger 75 is preferably set late in the cycle to prevent the possibility of the protection circuits from signalling the address contained in the SET PROTECT MODE instruction as an intrusion into a protected area.

Once the protection system is enabled, its operation is automatic. Compare Circuits 69 receive inputs from the Field Register triggers, and also from the seven high order bit positions 21–27 of the Address portion of Instruction Register 59 (shown in dotted lines in FIG. 2*b*). As illustrated, the input lines from the Instruction Register include both the 1 and 0 outputs from each of the bit positions 21–27. The inputs to the Compare Circuits 69 from Field Register 38, likewise include both the 1 and 0 outputs from each bit position. The Compare Circuits 69 comprise two AND circuits 85 and 86 for each bit position compared. The AND circuits 85 and 86 are of the three input type and all inputs must be positive for a positive output to be obtained. Examination of FIG. 4*b* will show that the AND circuit 85 of each compared bit position receives the binary 0 output from the corresponding Field Register trigger and the binary 1 output from the corresponding Instruction Register trigger. The AND circuit 86 receives the binary 1 output from the Field Register trigger and the binary 0 output from the Instruction Register trigger. If there is correspondence between the Field Register bit and the corresponding bit in the address portion of the Instruction Register, neither AND circuit 85 nor 86 can produce an output. If there is no correspondence, an output will be provided from one or the other of the AND circuits 85 or 86, if the third input is present. An output from either 85 or 86 indicates inequality of the bits compared. The third input for the AND circuits 85 and 86 of each bit position is supplied from a mask line M21–M27 controlled by the Count Register 80. If the value stored in Count Register 80 enables a given bit position for comparison, the mask line supplying the comparing AND circuits 85 and 86 for that position will have a positive signal impressed thereon. If the bit position is not to be compared, the mask line will not be energized.

FIG. 4*a* illustrates the circuitry for activating mask lines M21–M27 in response to count values stored in the Count Register 80. As indicated earlier, the three positions 33, 34 and 35 of Count Register 80 store the $2^2$, $2^1$ and $2^0$ bits of a binary number from zero to seven. If all three bit positions of the register are in the 0 state (representing the value zero) then no mask line is energized and no comparing circuit is enabled to provide an output. If positions 33 and 34 of Count Register 80 are set to 0 but position 35 is set to 1, then a signal is supplied through line 87, OR circuit 88, line 89 and OR circuit 90 to energize mask line M21 to enable the comparing circuits for address bit position 21. If a value of two is stored in Count Register 80, as represented by bit position 34 being in the 1 state, then a signal is supplied through line 91, OR circuit 88, line 89 and OR circuit 90 to energize mask line M21 and a signal is also supplied through line 91 to OR circuit 92 to energize mask line M22. If the Count Register stores a value of three, as represented by bit position 34 and 35 both being in 1 state, then mask lines M21 and M22 are energized as just described and in addition a signal is supplied through AND circuit 93, line 94 and OR circuit 95 to energize mask line M23.

A count value of four, indicated by bit position 33 of Count Register 80 being in the 1 state supplies signals through line 96 to each of OR circuits 90, 92 and 95 and also directly to line M24. In the case of a count value of five, as represented by bit positions 33 and 35 both being in the 1 state, mask lines M21, M22, M23 and M24 are energized through the line 96 as just described. Mask line M25 is energized by application of signals to both inputs of AND circuit 97, one input being supplied from line 96 and the other input being supplied through OR circuit 88 from line 87. It will be noted that since OR circuit 88 is supplied both from positions 34 and 35 of the Count Register 80, mask line M25 will also be energized for a count of six, as represented by positions 33 and 34 of the Count Register 80 being in the 1 state. In addition, a count of six will cause mask line M26 to be energized by application of both inputs to AND circuit 98, one input from line 96 and one input from line 91.

A count value of seven stored in Count Register 80 is represented by all three bit positions being in the 1 state under this condition, all mask lines M21 through M27 are energized. Lines M21 through M26 are energized as described and line M27 is energized through AND circuit 99 which receives one input from each of line 87, 91 and 96.

As described earlier one of the comparing circuits 85 and 86 of a given address bit position provides an output only if that bit position is enabled by its masking line and if there is a difference in the values of the corresponding address bit and field bit. Thus an output from any AND circuit 85 or 86 indicates inequality while lack of an output indicates equality. The outputs of all AND circuits 85 and 86 are conducted via cable 100 to OR circuit 101. A positive output signal on line 102 indicates an unequal comparison result. If none of the AND circuits 85 or 86 provides a positive output, line 102 will be negative. Inverter 103 produces a positive output on line 104 under these circumstances to indicate an equal comparison result. It will be recalled that the purpose of the Status Register 74 is to determine whether equality or inequality of the comparison between the Field Register contents and the corresponding bits of an address constitutes an intrusion into a protected area. As shown in FIG. 4*c*, two AND circuits 105 and 106 assist in this operation. AND circuit 105 is controlled by the binary one output of the Status Register 74 and AND circuit 106 is controlled by the binary zero output. If a comparison between the Field Register contents and the corresponding bits of an address produces a positive signal on line 102 indicating inequality, and if the Status Register is set to the one state, then AND circuit 105 will produce a positive output indicating an intrusion into a protected area. If the results of comparison between the Field Register contents and the corresponding bits of an address produces an equal signal on line 104, then an intrusion into a protected location is signalled by AND circuit 106 only if Status Register 74 is set to the zero state. The outputs of AND gates 105 and 106 are combined through OR circuit 107 to supply a line 108. Any positive signal on line 108 indicates an intrusion into a protected area.

Line 108 supplies a four input AND circuit 109, which has as its other inputs the binary 1 output of Mode Trigger 75, the memory STORE command line 76, and a sample pulse 110. AND circuit 109 supplies a positive signal on its output line 111 only if the system is in the protect mode and there is an intrusion into a protected area and the attempted access is a STORE operation wherein previously stored information at the accessed location will be destroyed. Output line 111 supplies the lines 77, 78 and 79 described earlier. The purpose of lines 77 and 78 is to change the STORE command supplied to Memory Control Circuits 51 to a READ command, to preserve the information previously stored in the location sought to be accessed. Line 77 is supplied from line 111 through Inverter 112 and carries a positive signal only when line 111 is not positive. Line 77 controls an AND gate 113 which gates the STORE command on line 76 to the Memory Control Circuits. Thus, when a positive signal is applied to line 111, indicating violation of a protected address, line 77 will be negative and AND gate 113 will be deconditioned, blocking the STORE command. The sample pulse line 110 is also supplied to AND gate 113 to prevent application of the STORE command to the Memory Control Circuits 52 before the protection circuits have made a determination of whether a violation exists.

Line 78, which is supplied directly from line 111, is combined with the READ command line 114 in OR circuit 115. Thus, whenever a violation of a protected location occurs, as signalled by line 111, a READ command is given to Memory 50 via line 78, regardless of whether line 114 is energized or not.

Line 79, which is supplied directly from line 111, informs the Program Interrupt Circuits 66 of the violation of a protected location. This line is employed to set an indicator in the Interrupt Circuits 66. The Brooks Jr. patent, referenced earlier, discloses how an interrupt program may be initiated in response to the setting of an indicator. The interrupt program will analyze the violation and perform whatever steps are necessary. It is not believed necessary to describe the interrupt operation in detail herein.

It will be apparent from the foregoing description of the protection circuits that their operation is largely free running. Once the several registers 68, 74 and 80 have been loaded, and the Mode Trigger 75 set, no further control is necessary. The cable 70 transmits the bit values of the high order seven bits of each address stored in Instruction Register 59 to Compare Circuits 69 by constantly monitoring the condition of the proper bit positions of that register. In like manner the conditions of the several bit positions of Field Register 68 are constantly montiored. Although the comparison results may not be valid at certain points in a cycle; specifically, when the address portion of Instruction Register 59 is being cleared and loaded (for example, between about I-9 and I-11 time in the system shown in the Brooks patent) this is taken into account by removing the sample pulse from line 110 during these periods. The sample pulse on line 110 is the only timing pulse required for operating the protecting circuits, excepting, of course, the timing and control pulses which may be required to load and enable the protection system and those employed in the Program Interrupt circuits for analyzing and correcting errors leading to violations of protected locations.

The protection offered by the system just described insures against accidental loss of information through any error or malfunction which causes unauthorized access into a protected area of storage. The only way in which access to a protected location for the purpose of storage may be gained is to disable the protection circuit by resetting the Mode Trigger 95, or by changing the contents of the Field, Status and Count Registers to relocate the protected area. This latter method of access requires that a new SET PROTECT MODE instruction be given. To insure that such an instruction is not given by accident while a previous SET PROTECT MODE instruction is in effect, it may be required that a RELEASE PROTECT MODE instruction be given before a new SET PROTECT MODE instruction can be effective. This may be readily accomplished by requiring that a SET PROTECT MODE instruction examine the state of Mode Triggers 75 before clearing and loading the several registers of the protection system. Examination may be accomplished as shown in FIG. 4*c*. As indicated earlier, the setting of Trigger 75 is accomplished late in the cycle of execution of a SET PROTECT MODE instruction. The SET MODE TRIGGER line from gate control circuits 65 may be brought up earlier than the setting time and may be required to wait for a timing pulse on line 116 to gate it through AND gate 117 to the S terminal of Trigger 75. This pulse may occur just prior to the end of operation of the instruction. While the SET MODE TRIGGER line is up and prior to the occurrence of the timing pulse on line 116, the SET MODE TRIGGER line may be compared with the binary 1 output of Mode Trigger 75 through AND gate 118, which is sampled by a timing line 119 early in the cycle of execution of the instruction. If the Trigger 75 is in the 1 state already, indicating that the system has not been released from a previous SET PROTECT MODE instruction, an interrupt indicator in Program Interrupt Circuits 66 may be set, causing an interrupt program to be initiated to analyze the situation.

In the illustrative embodiment, the Comparing Circuits 69 are shown as receiving the address sought to be accessed from the Address portion of the Instruction Register 59. Only addresses which are sent to Memory 50 through this register will be checked. It will be apparent that addresses sought to be accessed might be checked from other registers, if desired. For example, the Compare Circuits 69 might receive their current address input directly from the Memory Addressing Circuits 51, rather than from Instruction Register 59. All addresses sent to Memory 50 would then be compared. This arrangement might be desirable in situations where certain addresses are applied to Memory 50 from sources other than the Instruction Registers, for example, from the Arithmetic and Logic Circuits 62 as in certain table lookup procedures.

It is believed apparent from the foregoing description that the present invention provides an extremely efficient and economical means for protecting selected groups of storage locations in a memory from unauthorized accesses. The combination of the Field, Status and Count registers provides substantial flexibility in definition of the size and location of the protected area and permits inclusion of noncontiguous groups of addresses in the protected area. These circuits provide this function without the necessity of storing even one full address word, and without employing any complex and sophisticated comparing circuitry.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In combination with a memory having a plurality of addressable storage locations which are assigned addresses in an ordered sequence, said address being employed to obtain access to said locations, means for protecting predetermined locations in said memory comprising:

(a) means for storing a configuration of address identifying indicia which is common to a plurality of addresses in said memory;

(b) means controllable for comparing at least a part of each address employed to obtain access to a location in said memory with at least a part of the configuration stored in said register means;

(c) means for signalling favorable or unfavorable comparison; and (d) means responsive to a predetermined one of said favorable or unfavorable comparison signals for signalling a violation of a protected addressable location.

2. In combination with a memory having a plurality of addressable storage locations which are assigned addresses in an ordered sequence, said addresses being employed to obtain access to said locations, means for protecting predetermined locations in said memory comprising:

(a) means for storing a configuration of address identifying indicia which is common to a plurality of addresses in said memory;

(b) means controllable for comparing each address employed to obtain access to a location in said memory with the configuration stored in said register means to determine whether the said each address contains the said configuration;

(c) means for signalling favorable or unfavorable comparison;

(d) means responsive to a predetermined one of said favorable or unfavorable comparison signals for signalling a violation of a protected addressable location; and (e) masking means for forcing a favorable comparison of part of said configuration regardless of actual comparison to control the number of protected addressable locations.

3. In a data processing system which includes a memory device having a plurality of addressable locations each of which is assigned a unique address, means for specifying a selected address, and means responsive to said specifying means to condition the addressable location corresponding to said selected address for access, the improvement in means for protecting predetermined addressable locations in said memory against unauthorized access comprising:

(a) register means for storing a configuration of address indicia which is common to a plurality of addresses in said memory;

(b) means for comparing at least a portion of each address specified by said specifying means with at least part of the contents of said register means;

(c) means responsive to said means for comparing for signalling equality or inequality of the comparison; and (d) means responsive to a predetermined one of said equality or inequality signals for signalling a violation of a protected addressable location.

4. In a data processing system which includes a memory device having a plurality of addressable locations each of which is assigned a unique address, means for specifying a selected address, and means responsive to said specifying means to condition the addressable location corresponding to said selected address for access, the improvement in means for protecting predetermined addressable locations in said memory against unauthorized access comprising:

(a) register means for storing a configuration of address indicia which is common to a plurality of addresses in said memory;

(b) means for comparing at least a portion of each address specified by said specifying means with at least part of the contents of said register means;

(c) means responsive to said means for comparing for signalling equality or inequality of the comparison;

(d) means responsive to a predetermined one of said equality or inequality signals for signalling a violation of a protected addressable location; and (e) means selectively operable for rendering said violation signalling means ineffective, whereby to permit authorized access to a protected addressable location.

5. In a data processing system which includes a memory device having a plurality of addressable locations each of which is assigned a unique address consisting of a plurality of binary bits, means for specifying a selected address, and means responsive to said specifying means to condition the addressable location corresponding to said selected address for access, the improvement in means for protecting predetermined addressable locations in said memory against unauthorized access comprising:

(a) register means for storing a plurality of binary bits;

(b) comparing means for comparing each binary bit stored in said register means with a predetermined binary bit of each address specified in said specifying means;

(c) signalling means responsive to the comparing means for signalling equality if all of the binary bits compared are equal and for signalling inequality if any of the binary bits compared are unequal;

(d) masking means associated with said comparing means controllable for forcing an equal comparison result of at least some of said compared bits regardless of the actual comparison result;

(e) control means for determining the number of compared bits to be forced to an equal comparison and for controlling the masking means in accordance with said determination; and (f) means for signalling violation of a protected addressable location in response to a predetermined signal from said signalling means.

6. In a data processing system which includes a memory device having a plurality of addressable locations each of which is assigned a unique address consisting of a plurality of binary bits, means for specifying a selected address, and means responsive to said specifying means to condition the addressable location corresponding to said selected address for access, the improvement in means for protecting predetermined addressable locations in said memory against unauthorized access comprising:

(a) a multi-bit field register for storing a plurality of binary bits which are common to a plurality of addresses in said memory;

(b) comparing means associated with each bit of said field register for comparing the binary bit stored therein with a corresponding binary bit of each address specified in said specifying means;

(c) signalling means responsive to each comparing means for signalling equality if the binary bits compared are equal and for signalling inequality if the binary bits compared are unequal;

(d) masking means associated with each said comparing means controllable for forcing an equal comparison result of said compared bits regardless of the actual comparison result;

(e) a count register for storing a count value indicating the number of bits stored in said field register to be compared with corresponding bits of addresses specified by said specifying means;

(f) control means responsive to the count value stored in said count register for controlling the masking means to force an equal comparison in the comparing means associated with those bits of the field register which are not to be compared; and (g) means for signalling violation of a protected addressable location in response to a predetermined signal from said signalling means.

7. In a data processing system which includes a memory device having a plurality of addressable locations each of which is assigned a unique address consisting of a plurality of binary bits, means for specifying a selected address, and means responsive to said specifying means to condition the addressable location corresponding to said selected address for access, the improvement in means for protecting predetermined addressable locations in said memory against unauthorized access comprising:

(a) a multi-bit field register for storing a plurality of binary bit values which are common to all addresses of a block of addressable locations in said memory;

(b) comparing means associated with each bit of the field register operative when enabled and upon specification of an address by said specifying means for comparing the binary bit value stored in the associated bit of field register with the value of the corresponding bit of the address specified by said specifying means and providing a signal if compared bit values are unequal;

(c) masking means associated with each said comparing means controllable for enabling the comparison means from providing a signal;

(d) a count register for storing a number equal to or smaller than the number of bits stored in the field register;

(e) control means responsive to the value stored in the count register for activating the masking means to enable a corresponding number of said comparing means;

(f) means responsive to a signal from any comparing means for producing an unequal indication and responsive to the absence of a signal from all of the comparing means for producing an equal indication;

(g) status means for enabling either the unequal or equal indication signal to signal an intrusion into a protected area; and (h) mode control means responsive to a control signal specifying that memory protection is in effect for enabling the signal which signals an intrusion to represent an unauthorized access of a protected addressable location.

8. In a data processing system which includes a memory device having a plurality of addressable locations each of which is assigned a unique address consisting of a plurality of binary bits, means for specifying a selected address, and means responsive to said specifying means to condition the addressable location corresponding to said selected address for access, the improvement in means for protecting predetermined addressable locations in said memory against unauthorized access comprising:

(a) a multi-bit field register for storing a plurality of binary bit values which are common to all addresses of a block of addressable locations in said memory;

(b) comparing means associated with each bit of the field register operative when enabled and upon specification of an address by said specifying means for comparing the binary bit value stored in the associated bit of the field register with the value of the corresponding bit of the address specified by said specifying means and providing a signal if compared bit values are unequal;

(c) masking means associated with each said comparing means controllable for enabling the comparison means from providing a signal;

(d) a count register for storing a number equal to or smaller than the number of bits stored in the field register;

(e) control means responsive to the value stored in the count register for activating the masking means to enable a corresponding number of said comparing means;

(f) means responsive to a signal from any comparing means for producing an unequal indication and responsive to the absence of a signal from all of the comparing means for producing an equal indication;

(g) status means for enabling either the unequal or equal indication signal to signal an intrusion into a protected area; and (h) a mode control trigger settable and resettable by control signals responsive to a control signal and operable when set to specify that memory protection is in effect and to enable the signal which signals an intrusion to indicate an unauthorized access of a protected addressable location.

9. The invention defined in claim 8 including selectively operable control means for setting and resetting said mode control trigger, and means responsive to operation of said setting control means for testing the state of said mode control trigger and producing a signal if the mode contril trigger is already set.

10. In a data processing system which includes a memory device having a plurality of addressable locations each of which is assigned a unique address consisting of a plurality of binary bits having an ordered relationship, means for specifying a selected address, and means responsive to said specifying means to condition the addressable location corresponding to said selected address for access, the improvement in means for protecting predetermined addressable locations in said memory against unauthorized access comprising:

(a) a multi-bit field register for storing a plurality of binary bit values which represent a predetermined number of consecutive bits of an address including the highest order address bit;

(b) comparing means associated with each bit of the field register operative upon specification of an address by said specifying means for comparing the binary bit value stored in the associated bit of the field register with the value of the corresponding bit of the address specified by said specifying means and providing a signal if compared bit values are unequal;

(c) masking means associated with each said comparing means controllable for enabling the comparison means from providing a signal;

(d) a count register for storing a number equal to or smaller than the number of bits stored in the field register;

(e) control means responsive to the value stored in the count register for activating the masking means to enable the number of said comparing means associated with a number of consecutive bits (starting from the highest order bit) of said field register equal to the value in the count register;

(f) means responsive to a signal from any comparing means for producing an unequal indication and responsive to the absence of a signal from all of the comparing means for producing an equal indication;

(g) status means for enabling either the unequal or equal indication signal to signal an intrusion into a protected area; and (h) mode control means responsive to a control signal specifying that memory protection is in effect for enabling the signal which signals an intrusion to represent an unauthorized access of a protected addressable location.

No references cited.

ROBERT C. BAILEY, *Primary Examiner.*

P. J. HENON, *Assistant Examiner.*